US008731288B2

(12) United States Patent
Tsukada

(10) Patent No.: US 8,731,288 B2
(45) Date of Patent: May 20, 2014

(54) IMAGE PROCESSING TECHNIQUES FOR COLOR CORRECTION

(75) Inventor: Masato Tsukada, Tokyo (JP)

(73) Assignee: NEC Corporation, Tokyo (JP)

(*) Notice: Subject to any disclaimer, the term of this patent is extended or adjusted under 35 U.S.C. 154(b) by 297 days.

(21) Appl. No.: 13/140,848

(22) PCT Filed: Dec. 28, 2009

(86) PCT No.: PCT/JP2009/007338
§ 371 (c)(1),
(2), (4) Date: Jun. 20, 2011

(87) PCT Pub. No.: WO2010/084560
PCT Pub. Date: Jul. 29, 2010

(65) Prior Publication Data
US 2011/0268356 A1 Nov. 3, 2011

(30) Foreign Application Priority Data
Jan. 23, 2009 (JP) ................................. 2009-013614

(51) Int. Cl.
*G06K 9/00* (2006.01)
*G09G 5/02* (2006.01)
(52) U.S. Cl.
USPC ........................................ 382/167; 345/604
(58) Field of Classification Search
USPC ........................... 382/162, 167; 345/603, 604
See application file for complete search history.

(56) References Cited

U.S. PATENT DOCUMENTS

| 5,754,448 A * | 5/1998 | Edge et al. ..................... 358/516 |
| 6,760,108 B2 * | 7/2004 | Ohga ............................. 356/406 |
| 2003/0053088 A1 | 3/2003 | Kanai et al. |

(Continued)

FOREIGN PATENT DOCUMENTS

| JP | 11-146214 A | 5/1999 |
| JP | 2000050086 A | 2/2000 |

(Continued)

OTHER PUBLICATIONS

The Extended European Search Report for EP09838753 dated Jun. 29, 2012.

(Continued)

*Primary Examiner* — Yubin Hung
(74) *Attorney, Agent, or Firm* — Sughrue Mion, PLLC

(57) ABSTRACT

Each pixel of an input image is subjected to first color conversion by means of colorimetric color reproduction and converted to a first color device value of a target color space. Further, a difference DI between a white luminance of an originating color space and a luminance of pixels of the originating color space is calculated. When generating an output image, pixels with a difference DI of 0 keeps the color device value of the originating color space. For the pixels with a difference DI greater than 0, a second color device value is calculated as a color device value of the output image, the second color device value being a sum of the abovementioned color device value and a value which is obtained by multiplying the difference between the first color device value and the abovementioned color device value by a coefficient that is greater than 0 and less than or equal to 1. Due to this, when generating an output image of a target color space from an input image of an originating color space, the color image can be reproduced more brightly while achieving coincident color appearance.

12 Claims, 3 Drawing Sheets

(56) References Cited

U.S. PATENT DOCUMENTS

| | | | |
|---|---|---|---|
| 2007/0086029 A1* | 4/2007 | Tsai et al. | 358/1.9 |
| 2008/0055351 A1 | 3/2008 | Torigoe et al. | |
| 2009/0244560 A1* | 10/2009 | Li | 358/1.9 |

FOREIGN PATENT DOCUMENTS

| | | |
|---|---|---|
| JP | 2000113174 A | 4/2000 |
| JP | 2003018416 A | 1/2003 |
| JP | 2003099026 A | 4/2003 |
| JP | 2003153015 A | 5/2003 |

OTHER PUBLICATIONS

International Search Report for PCT/JP2009/007338 mailed Feb. 2, 2010.

"Image technology colour management—Architecture. profile format, and data structure", Specification ICC.1:2004-10 (Profile version 4.2.0.0): International Color Consortium, 2004, pp. 73-85.

J. Tajima, "Image engineering series 10: Color image replication theory, fundamentals of color management", Maruzen Co. Ltd., Sep. 30. 1996, pp. 33-39.

* cited by examiner

IMAGE PROCESSING TECHNIQUES FOR COLOR CORRECTION

This application is the National Phase of PCT/JP2009/007338, filed Dec. 28, 2009, which claims the benefit of priority, and incorporated herein by reference in its entirety, the following Japanese Patent Application No. 2009-013614 filed on Jan. 23, 2009.

TECHNICAL FIELD

The present invention relates to an image processing method, an image processing apparatus, and a recording medium for a color image reproducing apparatus, and more particularly to an image processing technique to make a color image brighter in the color image reproducing apparatus and to achieve desired color reproduction.

BACKGROUND ART

Various methods have been suggested for performing color reproduction between color image reproducing apparatuses having different color characteristics such as a color scanner, a color monitor, a color projector, a color printer, some of which will be described as an example. Although the color image reproducing apparatus is variously called depending on the literatures cited in the following description, it is called "color image reproducing apparatus" in this specification for the sake of clarification.

In a color reproduction method disclosed in Annex D of Non-Patent literature 1, a correspondence relation between a color device value of a color image reproducing apparatus and the Profile Connection Space (PCS) that is specified by the ICC (International Color Consortium) and has CIE standard illuminant D50 as reference white is obtained first. Then, a color device value of the color image reproducing apparatus which is an input source is converted to a color device value of the color image reproducing apparatus which is an output destination through the PCS. More specifically, the color device value of the color image reproducing apparatus of the input source is converted into the PCS, and then the PCS is converted into the color device value of the color image reproducing apparatus which is the output destination. When the conversion from the color device value to the PCS is performed, if the whites are different, chromatic adaptation conversion of human complete chromatic adaptation type is applied. The color reproduction in this case corresponds to color conversion in which the color device value corresponding to white of the color image reproducing apparatus which is the input source is converted to the color device value corresponding to white of the color image reproducing apparatus which is the output destination.

A color conversion method, which takes the human complete chromatic adaptation into account, is based on the von Kries model. According to this color conversion method, the chromatic adaptation is carried out based on the change in three kinds of spectral sensitivity (ργβ) in the human visual system such that the spectral sensitivity is upon change in illumination, changed in its sensitivity balance without changes in shape of the spectral curves so as to bring the two whites into coincidence. Assume ργβ sensual quantities of illumination 1 be (ρ0, γ0, β0), the ργβ sensual quantities of an object in illumination 1 be (ρ, γ, β), and ργβ sensual quantities of illumination 2 be (ρ0', γ0', β0'), with ργβ sensual quantities of the same object under illumination 2 being (ρ', γ', β') Then, the ργβ sensual quantities of the visual system of the object color are expressed by: ρ/ρ0, γ/γ0, β/β0, ρ'/ρ0', γ'/γ0', and β'/β0'. In order for the color appearance of the object to be coincident under the illumination 1 and under the illumination 2, it suffices if the above-mentioned ργβ sensual quantities are coincident, as shown in the formula (1) and the formula (2).

$$\begin{bmatrix} \rho/\rho 0 \\ \gamma/\gamma 0 \\ \beta/\beta 0 \end{bmatrix} = \begin{bmatrix} \rho'/\rho'0 \\ \gamma'/\gamma'0 \\ \beta'/\beta'0 \end{bmatrix} \quad (1)$$

$$\begin{bmatrix} 1/\rho 0 & 0 & 0 \\ 0 & 1/\gamma 0 & 0 \\ 0 & 0 & 1/\beta 0 \end{bmatrix} \begin{bmatrix} \rho \\ \gamma \\ \beta \end{bmatrix} = \begin{bmatrix} 1/\rho'0 & 0 & 0 \\ 0 & 1/\gamma'0 & 0 \\ 0 & 0 & 1/\beta'0 \end{bmatrix} \begin{bmatrix} \rho' \\ \gamma' \\ \beta' \end{bmatrix} \quad (2)$$

Further, the ργβ sensual quantities can be obtained from the tristimulus values XYZ by linear transformation as shown in the formula (3).

$$\begin{bmatrix} \rho \\ \gamma \\ \beta \end{bmatrix} = M \begin{bmatrix} X \\ Y \\ Z \end{bmatrix} \quad \begin{bmatrix} \rho' \\ \gamma' \\ \beta' \end{bmatrix} = M \begin{bmatrix} X' \\ Y' \\ Z' \end{bmatrix} \quad (3)$$

It is noted that ρ0, γ0, β0, ρ0', γ0', β0' in the above formula (1) may be obtained by substituting tristimulus values (X0, Y0, Z0), (X0', Y0', Z0') of the illumination 1 and the illumination 2 into the formula (3). Further, a matrix of Pitt, a matrix of Estevez, a matrix of Bradford or the like is used as the transformation matrix M in the formula (3).

Further, the von Kries chromatic adaptation prediction formula shown in the formula (4) may be obtained by substituting the formula (3) into the formula (2). Note that D in the formula (4) is shown in the formula (5).

$$\begin{bmatrix} X' \\ Y' \\ Z' \end{bmatrix} = M^{-1} DM \begin{bmatrix} X \\ Y \\ Z \end{bmatrix} \quad (4)$$

$$D = \begin{bmatrix} \rho'0/\rho 0 & 0 & 0 \\ 0 & \gamma'0/\gamma 0 & 0 \\ 0 & 0 & \beta'0/\beta 0 \end{bmatrix} \quad (5)$$

In the color image reproducing apparatus of the RGB color system, the correspondence relation between the color device values RGB and the tristimulus values XYZ is as shown in formula (6). It is assumed here that the color device values RGB are obtained by linearly converting the input characteristic by performing inverse gamma correction in advance in consideration of a gamma characteristic of the color image reproducing apparatus.

$$\begin{bmatrix} X \\ Y \\ Z \end{bmatrix} = Q \begin{bmatrix} R \\ G \\ B \end{bmatrix} \quad (6)$$

In the formula (6), Q is 3×3 matrix, which will be hereinafter referred to as an RGB-XYZ transformation matrix. The RGB-XYZ transformation matrix Q varies depending on color characteristics of the color image reproducing apparatus. When black tristimulus values (Xk, Yk, Zk) are considered, the formula (6) can be expressed as formula (7).

$$\begin{bmatrix} X \\ Y \\ Z \end{bmatrix} = Q \begin{bmatrix} R \\ G \\ B \end{bmatrix} + \begin{bmatrix} X_k \\ Y_k \\ Z_k \end{bmatrix} \quad (7)$$

Thus, when the black tristimulus values are zero, the color conversion from the RGB of the color image reproducing apparatus having the RGB-XYZ transformation matrix Q of "A" to the R'G'B' of the color image reproducing apparatus having the RGB-XYZ transformation matrix Q of "B" is as shown in formula (8), using the above-stated color conversion method considering the human complete chromatic adaptation.

$$\begin{bmatrix} R' \\ G' \\ B' \end{bmatrix} = B^{-1} M^{-1} DMA \begin{bmatrix} R \\ G \\ B \end{bmatrix} \quad (8)$$

Note that the matrix D in the formula (8) can be calculated using the tristimulus values of white of each of the two color image reproducing apparatuses and the formulae (3) and (5).

Patent literature 1 suggests a color reproduction method considering incomplete chromatic adaptation in color reproduction between color image reproducing apparatuses having different whites. This method restores white surface reflectances of the conversion source and the conversion destination using a correlated color temperature of white of the color image reproducing apparatus of the conversion source and the conversion destination, and calculates, from two white surface reflectances that are restored, white adaptation white surface reflectance in the state of incomplete chromatic adaptation. Then, the relation between the white surface reflectance of the conversion source and the white adaptation white surface reflectance in the state of incomplete chromatic adaptation is similarly applied to the surface reflectance of other colors, thereby achieving coincident color appearance between color image reproducing apparatuses having different whites.

Further, Patent literature 2 discloses an image processing apparatus that executes desired image processing to an input signal using a color correction table for changing an amount of conversion for a white point in accordance with a white luminance provided from a color image reproducing apparatus, to output the signal to the color image reproducing apparatus. This image processing apparatus uses the characteristic that the human eye tends to adapt to bright light more than to dark light. The processing is performed to make a target white point after the conversion close to a white point of the color image reproducing apparatus in accordance with a white luminance provided from the color image reproducing apparatus being increased.

Furthermore, Patent literature 2 discloses an image processing apparatus that is provided with a color correction table which prioritizes color reproduction and is configured to perform color correction for achieving faithful color reproduction, and a color correction table which prioritizes lightness and is configured to perform color correction that prioritizes lightness. Patent literature 2 further discloses a method of making a target white point after conversion by the color correction table that prioritizes color reproduction close to a white point of the color image reproducing apparatus's, and a method of switching the color correction table that prioritizes lightness and the color correction table that prioritizes the color reproduction according to the input signal such as a natural image or presentation data. In switching the tables according to the input signals, the table is switched to the color conversion table that prioritizes the color reproduction when the input signal is natural image data, and the table is switched to the color correction table that prioritizes lightness when the input signal is presentation data.

Further, Patent literature 3 discloses a method of adding, to the method disclosed in Patent literature 2, processing to change an amount of conversion for a white point according to the elapsed time after the start of color correction.

The methods disclosed in Patent literatures 1 to 3 relate to a color reproduction method of setting the chromaticity of the adaptation white reproduced by the color image reproducing apparatus to a desired chromaticity considering the (incomplete) chromatic adaptation in the human color perception and applying the color conversion on the basis of the adaptation white for other colors than white by the corresponding color reproduction or an equivalent color reproduction.

Further, it is relatively easy for the color display to achieve color reproduction by using a specific color space (e.g., CIE standard illuminant D65 in sRGB and Adobe RGB) in which white chromaticity of a color to be reproduced is specified by means of colorimetric color reproduction. Further, the related methods of the above-mentioned Patent literatures 1 to 3 show the color reproduction method of setting the chromaticity of the adaptation white reproduced by the color image reproducing apparatus to a desired chromaticity considering the (incomplete) chromatic adaptation in the human color perception and applying the color correction (color conversion) obtained on the basis of the adaptation white for other colors than white as the corresponding color reproduction or the equivalent color reproduction.

CITATION LIST

Patent Literature

Patent Literature 1
Japanese Unexamined Patent Application Publication No. 2000-113174
Patent Literature 2
Japanese Unexamined Patent Application Publication No. 2003-18416
Patent Literature 3
Japanese Unexamined Patent Application Publication No. 2003-99026

Non Patent Literature

Non-Patent Literature 1
Specification ICC. 1: 2004-10 (Profile version 4.2.0.0), International Color Consortium
Non-Patent Literature 2
Johji TAJIMA, "Image engineering series 10: Color image replication theory, fundamentals of color management", MARUZEN Co. Ltd., Sep. 30, 1996, pp. 33-39

SUMMARY OF INVENTION

Technical Problem

The color image reproducing apparatus may be required to reproduce a color image more brightly while achieving coincident color appearance depending on its intended purposes.

For example, when a color projector which is susceptible to surrounding ambient light is used, a white luminance is required to be increased as much as possible in order to maintain the contrast of the luminance.

By the way, according to the methods disclosed in Patent literatures 1 to 3, if the color reproduction is prioritized in the color image reproducing apparatus, it is required to make white chromaticity coincident by reducing the maximum luminance of color that can be output by the color image reproducing apparatus when the chromaticity of the color having the maximum luminance that can be output by the color image reproducing apparatus is different from the white chromaticity of the specified color space. Specifically, according to these methods, it is possible to reproduce the desired color tone by the corresponding color reproduction or the equivalent color reproduction. However, along with this, the white luminance may be reduced below the maximum luminance that can be output by the color image reproducing apparatus. This results in less lightness of the color image when reproduction is performed.

Further, each method applies the color conversion on the basis of white to every color. It is known that, when the white color in the color image reproducing apparatus is set to any possible color with the maximum luminance output from the color image reproducing apparatus in order to maintain the lightness when reproduction is performed, the color conversion is not performed or the effect of the color conversion is weakened. Thus, these methods may not be able to make the color appearance coincident although the color image can be reproduced brightly.

Patent literature 2 and Patent literature 3 do not describe the method of creating a color correction table that prioritizes lightness. Thus, the color appearance when the color correction is performed using the color correction table that prioritizes lightness is unclear.

Solution to Problem

One aspect of the present invention is an image processing method that generates, from an input image which is an image in an originating color space, an output image which is an image in a target color space. In this image processing method, feature amount acquire processing, a difference calculation processing, first color conversion, and output image generation processing are performed.

The feature amount acquire processing acquires, for each color represented by each color device value of the input image, a feature amount that can represent lightness of the color, and a feature amount of white in the originating color space.

The difference calculation processing calculates, for each color represented by each color device value of the input image, a first difference which is a difference between a feature amount that can represent the lightness of white in the originating color space and the above-stated feature amount of the color represented by the color device value.

The first color conversion converts, for each color represented by each color device value of the input image, the color device value of the color into a first color device value which is a color device value in the target color space by colorimetric color reproduction.

The output image generation processing outputs the second color device value obtained by second color conversion as the color device value of the output image. The second color conversion calculates, for each color represented by each color device value of the input image, the second color device value in such a way that the second color device value is the color device value (color device value in the originating color space) when the first difference is 0, and is a sum of the color device value and a value obtained by multiplying a second difference which is a difference between the first color device value and the color device value by a coefficient which is greater than 0 and equal to or less than 1 when the first difference is greater than 0.

The second color conversion can be represented by the following formula (9). In the formula (9), the function f outputs 0 when the first difference is 0, and outputs a value which is larger than 0 and equal to or less than 1 when the first difference is other than 0.

$$P2=P0+f(DI)(P1-P0) \qquad (9)$$

where P2: second color device value
P1: first color device value
P0: color device value in the originating color space
DI: first difference The image processing method of the above-mentioned aspect may be expressed by an image processing apparatus or system, a program that causes a computer to execute processing by the image processing method, or a recording medium that records the program in place of the image processing method. These are also effective as an aspect of the present invention.

Advantageous Effects of Invention

The color conversion technique of the present invention achieves reproduction of color images more brightly while achieving coincident color appearance.

DESCRIPTION OF EMBODIMENTS

Figure 1:
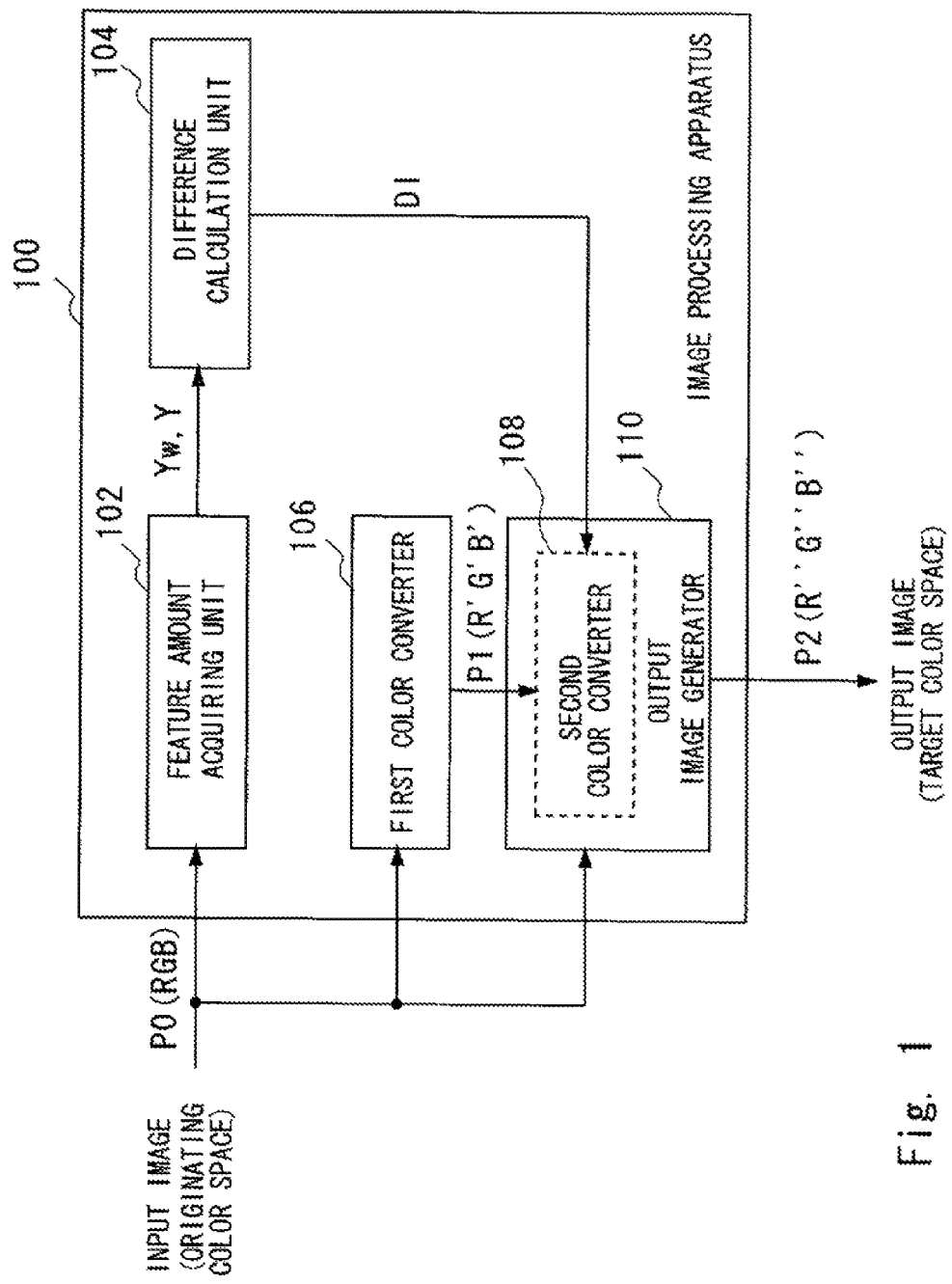
FIG. 1 is a diagram showing an image processing apparatus according to a first exemplary embodiment of the present invention.

Hereinafter, exemplary embodiments of the present invention will be described with reference to the drawings. For the sake of clarification of description, the following description and drawings are partially omitted or simplified as appropriate. Further, each element illustrated in the drawings as functional blocks performing various processing may be configured, in a hardware configuration, by a CPU, a memory, and other circuits, and in a software configuration, by a program loaded into a memory or the like. Therefore, it will be understood by a person skilled in the art that these functional blocks can be realized in various ways, e.g., by only hardware, only software, or the combination thereof, and should not be limited. Further, the program can be provided by being recorded in a recording medium, or may be provided by being transmitted by the Internet or other communication media. Further, the recording medium includes, for example, flexible disks, hard disks, magnetic disks, optical magnetic disks, CD-ROM, DVD, ROM cartridges, RAM memory cartridges with battery backup function, flash memory cartridges, non-volatile RAM cartridges and the like. Further, the communication medium includes a wired communication medium (e.g., telephone lines), and a wireless communication medium (e.g., microwave lines).

FIG. 1 shows an image processing apparatus 100 according to a first exemplary embodiment of the present invention. The image processing apparatus 100 generates, from an image (input image) in an originating color space, an image (output image) corresponding to the input image in a target color space. The originating color space and the target color space are two color spaces having different color characteristics.

The image processing apparatus 100 includes a feature amount acquiring unit 102, a difference calculation unit 104, a first color converter 106, and an output image generator 110, and the output image generator 110 includes a second color converter 108. For the sake of convenience of description, a color system of each of the input image and the output image is an RGB color system. In short, each color device value of the input image and the output image is shown by a combination of R value, G value, and B value. Further, it is assumed that the correspondence relation between RGB values and tristimulus values are known for any of the originating color space and the target color space. This means that an RGB-XYZ transformation matrix Q is known in the above-mentioned formula (6) or the formula (7) for both of the originating color space and the target color space. It is assumed that the RGB-XYZ transformation matrix of the originating color space is A, and the RGB-XYZ transformation matrix of the target color space is B.

The feature amount acquiring unit 102 acquires the feature amount of white in the originating color space, and the feature amount of each pixel of the input image. The feature amount may represent lightness, and a luminance may be used as the feature amount.

When the luminance is used as the feature amount, the feature amount acquiring unit 102 first calculates a white luminance Yw in the originating color space according to the following formulae (10) and (11).

$$\begin{bmatrix} X_w \\ Y_w \\ Z_w \end{bmatrix} = A \begin{bmatrix} 255 \\ 255 \\ 255 \end{bmatrix} \quad (10)$$

$$\begin{bmatrix} X_w \\ Y_w \\ Z_w \end{bmatrix} = A \begin{bmatrix} 255 \\ 255 \\ 255 \end{bmatrix} + \begin{bmatrix} X_{bk} \\ Y_{bk} \\ Z_{bk} \end{bmatrix} \quad (11)$$

Now, A represents the RGB XYZ transformation matrix in the color space which is the conversion source, and "$X_{bk}, Y_{bk}, Z_{bk}$" represents black tristimulus values XYZ in the originating color space.

Next, the feature amount acquiring unit 102 calculates a luminance Y in each pixel in the input image in the originating color space according to the following formula (12) or (13).

$$\begin{bmatrix} X \\ Y \\ Z \end{bmatrix} = A \begin{bmatrix} R \\ G \\ B \end{bmatrix} \quad (12)$$

$$\begin{bmatrix} X \\ Y \\ Z \end{bmatrix} = A \begin{bmatrix} R \\ G \\ B \end{bmatrix} + \begin{bmatrix} X_{bk} \\ Y_{bk} \\ Z_{bk} \end{bmatrix} \quad (13)$$

In this example, since the color system of the input image is RGB, the feature amount acquiring unit 102 needs to calculate the luminance Y from a color device value P0 (RGB) of the input image. However, when the color system of the input image is YCC, the feature amount acquiring unit 102 may directly acquire the luminance Y from the color device value of the input image. Further, the white luminance Yw in the originating color space may be acquired by other way than the calculation. For example, when the white luminance Yw is predetermined, it can be acquired by just reading out the set value.

The difference calculation unit 104 calculates, for each pixel of the input image, a difference DI between the luminance Y of the pixel and the white luminance Yw in the originating color space. This difference DI is, for example, shown by formula (14).

$$DI=(Yw-Y)/Yw \quad (14)$$

When the pixel is a white pixel, Y and Yw are the same value, which results in DI of 0. When the pixel is a black pixel, the value of Y is 0, which results in DI of 1. In short, the difference DI is a real number of 0 or larger and 1 or smaller.

The first color converter 106 performs first color conversion by colorimetric color reproduction, to convert the color device value P0 (RGB) of each pixel in the input image into the color device value in the target color space. The color device value obtained by the first color converter 106 is hereinafter referred to as "first color device value", which will be denoted by "P1" or "R'G'B'".

More specifically, the first color converter 106 calculates the tristimulus values XYZ of each pixel in the input image, and calculates the first color device value P1 (R'G'B') stated above from the color device value P0 (RGB) of each pixel in the input image according to formula (15).

$$\begin{bmatrix} R' \\ G' \\ B' \end{bmatrix} = B^{-1} A \begin{bmatrix} R \\ G \\ B \end{bmatrix}. \quad (15)$$

In the formula (15), $B^{-1}$ is the inverse matrix of an RGB-XYZ transformation matrix B of the target color space.

The second color converter 108 converts, for each pixel of the input image, the color device value P0 in the originating color space to the color device value in the target color space. In order to differentiate the color device value obtained by the second color converter 108 from the first device value obtained by the first color converter 106, the color device value obtained by the second color converter 108 is called "second device value", which is denoted by "P2" or "R"G"B"".

When converting the color device value P0 (RGB) in the originating color space into the second color device value P2 (R"G"B"), the second color converter 108 obtains the second color device value P2 of each pixel of the input image according to formula (16) using a function f, the function f outputting 0 when the difference DI is 0 and outputting a value which is greater than 0 and less than or equal to 1 when the difference DI is other than 0.

$$\begin{bmatrix} R'' \\ G'' \\ B'' \end{bmatrix} = \begin{bmatrix} R \\ G \\ B \end{bmatrix} + f(DI) \begin{bmatrix} R' - R \\ G' - G \\ B' - B \end{bmatrix} \quad (16)$$

In summary, the second color converter 108 multiplies a difference between the first color device value P1 obtained by the colorimetric color reproduction and the color device value P0 in the originating color space by 0 when the difference DI is 0 and a coefficient that is greater than 0 and less than or equal to 1 when the difference DI is other than 0 for each pixel of the input image, and then adds the multiplication result to the color device value P0, thereby obtaining the second color device value P2.

The output image generator 110 outputs the second color device value obtained by the second color converter 108 as the color device value of the output image. Thus, the output image in the target color space is generated.

Figure 2:
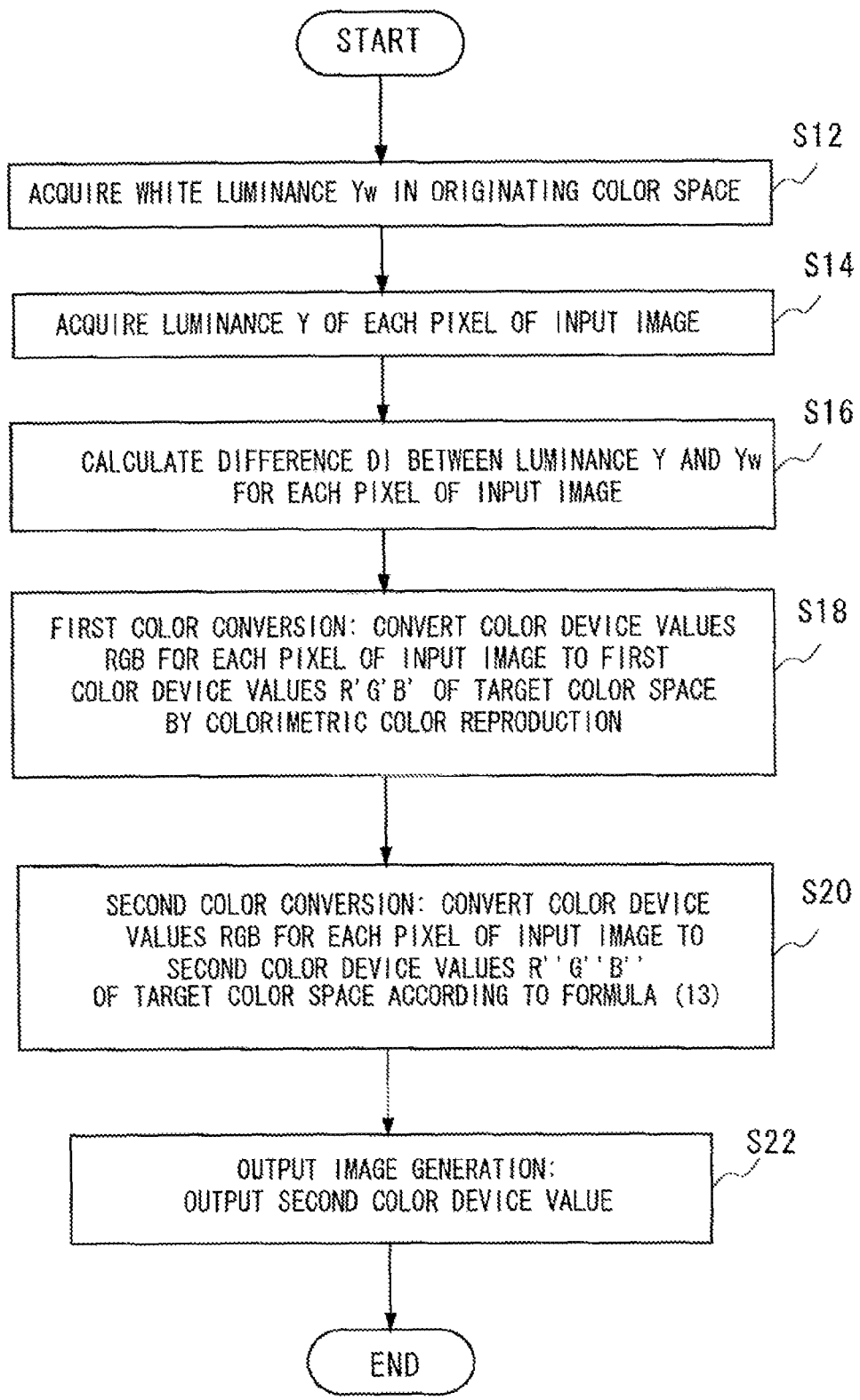
FIG. 2 is a flow chart showing processing in the image processing apparatus shown in FIG. 1.

FIG. 2 is a flow chart showing processing of the image processing apparatus 100 shown in FIG. 1. As shown in FIG. 2, the feature amount acquiring unit 102 first acquires the white luminance Yw in the originating color space and the luminance Y of each pixel of the input image (S12, S14). The difference calculation unit 104 then calculates, for each pixel of the input image, the difference DI between the luminance Y and the white luminance Yw in the originating color space (S16).

Further, the first color converter 106 performs first color conversion by the colorimetric color reproduction, and converts, for each pixel of the input image, the color device value P0 (RGB) in the originating color space to the first color device value P1 (R'G'B') in the target color space (S18).

The second color converter 108 then obtains the second color device value P2 for each pixel of the input image according to the formula (16) (S20).

Last, the output image generator 110 outputs each second color device value P2 obtained by the second color converter 108. Thus, the output image can be obtained (S22).

In the image processing apparatus 100, since the difference DI is 0 for the white pixel, the color device value in the originating color space of white is maintained. For example, when the color device value (R, G, B) in the originating color space of white is (255, 255, 255), the color device value (R", G", B") of the output image becomes (255, 255, 255) as well for the white pixel of the input image. Thus, the white luminance of the input image is maintained.

On the other hand, for the pixels having the difference DI larger than 0 among the pixels other than white, the color device value of the output image (second color device value P2) is a color device value between the color device value P0 in the originating color space and the first color device value P1 obtained by the colorimetric color reproduction. Namely, the color correction is performed so that the color device value in the target color space approaches the first color device value P1 obtained by the colorimetric color reproduction for pixels other than white.

Due to this, the color image can be reproduced more brightly while achieving coincident color appearance.

Further, it is preferable that the function f outputs larger value with increasing value of the difference DI within a range of "greater than 0 and less than or equal to 1" when the difference DI is other than 0. In this case, the difference DI itself may be the output value of the function f. In short, the formula (16) can be expressed by the following formula (17).

$$\begin{bmatrix} R'' \\ G'' \\ B'' \end{bmatrix} = \begin{bmatrix} R \\ G \\ B \end{bmatrix} + DI \begin{bmatrix} R' - R \\ G' - G \\ B' - B \end{bmatrix} \quad (17)$$

Although the image processing apparatus 100 uses the luminance as the feature amount that can represent the lightness, as an example, a brightness can be used instead. Further, this feature amount may include a color component, and a color difference Eab in which a color component is added to a brightness may be used. Needless to say, the color device value itself (e.g., RGB values) may be used. In this case, the difference of the feature amount is a Euclidean distance of the color device value. For example, when the color device value of white in the original space is (255, 255, 255), the difference DI is calculated as shown in formula (18).

$$DI = \sqrt{(255-R)^2 + (255-G)^2 + (255-B)^2} / \sqrt{195075} \quad (18)$$

Figure 3:
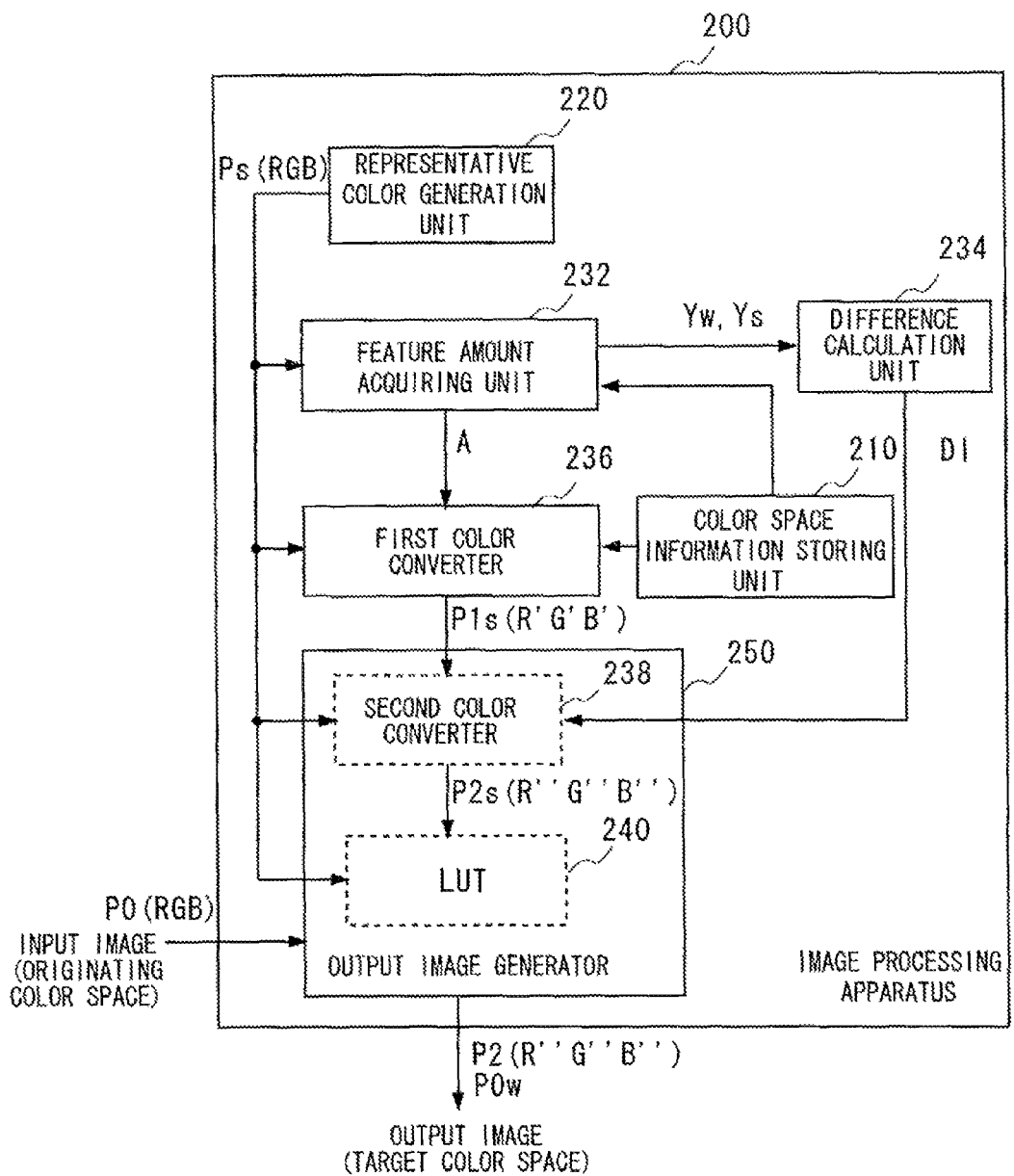
FIG. 3 is a diagram showing an image processing apparatus according to a second exemplary embodiment of the present invention.

FIG. 3 shows an image processing apparatus 200 according to the second exemplary embodiment of the present invention. The image processing apparatus 200 generates, from an image (input image) in an originating color space, an image (output image) corresponding to the input image in a target color space. The image processing apparatus 200 includes a color space information storing unit 210, a representative color generation unit 220, a feature amount acquiring unit 232, a difference calculation unit 234, a first color converter 236, and an output image generator 250, and the output image generator 250 includes a second color converter 238, and a look-up table (LUT) 240.

Also in this example, for the sake of convenience of description, each color system of the input image and the output image is the RGB color system. Thus, each color device value of the input image and the output image is a combination of R value, G value, and B value.

The color space information storing unit 210 stores color space information of the originating color space and the target color space. Various methods that are conventionally known can be used as the method of acquiring the color space information stored in the color space information storing unit 210. For example, the image editing software called PhotoShop (registered trademark) uses a GUI that can set an ICC profile to obtain the color information of the target color space and the originating color space. In this case, the color space information storing unit 210 may store the color space information of the target color space and the originating color space set through the GUI (not shown). The color space information is the information specifying the color space, such as a chromaticity of RGB phosphors, a white chromaticity and luminance, a gamma characteristic of each color signal and the like.

The representative color generation unit 220 generates a plurality of representative colors, to obtain the RGB values of each representative color. The plurality of representative colors are preferably generated to cover wider range of colors.

The feature amount acquiring unit 232, the first color converter 236, and the second color converter 238 respectively perform the same processing as the feature amount acquiring unit 102, the difference calculation unit 104, the second color converter 108 in the image processing apparatus 100 shown in FIG. 1 except that color to be processed is different. Note that, also in this exemplary embodiment, as an example, the luminance is used as the feature amount that can represent the lightness.

The feature amount acquiring unit 232 calculates a white luminance Yw in the originating color space, and a luminance Ys of each representative color. The feature amount acquiring unit 232 reads out the white luminance Yw in the originating color space from the color space information storing unit 210, and calculates an RGB-XYZ transformation matrix Q of the originating color space from the white chromaticity and the chromaticity of RGB phosphors of the originating color space stored in the color space information storing unit 210 (see Non-Patent literature 2). It is assumed that the RGB-XYZ transformation matrix Q of the originating color space is A.

Then, the feature amount acquiring unit 232 calculates the luminance Ys from a color device value Ps (RGB) of each representative color according to the formula (6) or (7) using an RGB-XYZ transformation matrix A. The feature amount acquiring unit 232 outputs the white luminance Yw in the originating color space and the luminance Ys in the originating color space of each representative color to the difference calculation unit 234, and outputs the RGB-XYZ transformation matrix A of the originating color space to the first color converter 236.

The difference calculation unit 234 calculates a difference DI between the luminance Ys of the representative color and the white luminance Yw in the originating color space for each representative color. This difference DI is, for example, the one shown in formula (19).

$$DI=(Yw-Ys)/Yw \quad (19)$$

The first color converter 236 performs first color conversion by the colorimetric color reproduction for each representative color, so as to convert the color device value Ps (RGB) of the representative color in the originating color space of each representative color to each first color device value P1 (R'G'B'). More specifically, the first color converter 236 calculates an RGB-XYZ transformation matrix B of the target color space from the white chromaticity and the chromaticity of the RGB phosphors of the target color space stored in the color space information storing unit 210, and calculates the first color device value P1 (R'G'B') from the color device value Ps (RGB) of each representative color according to the formula (15) using the RGB-XYZ transformation matrix B and the RGB-XYZ transformation matrix A of the originating color space obtained from the feature amount acquiring unit 232.

The second color converter 238 obtains a second color device value P2s (R"G"B") of each representative color according to the formula (16) for each representative color and outputs the values to the LUT 240.

The LUT 240 stores the color device value P0 in the originating color space in association with the second color device value P2s output from the second color converter 238 for each representative color.

The output image generator 250 obtains each color device value of the output image by using a color device value P0 w in the originating color space for the white pixel of the input image, and by referring to the LUT 240 to calculate the second color device value P2 (R"G"B") corresponding to the color device value P0 of the pixel by an interpolation method for pixels other than the white color. Note that an eight-point interpolation method or the like may be used, for example, as the interpolation method.

The image processing apparatus 100 shown in FIG. 1 performs, for each pixel of the input image, feature amount acquisition, difference calculation, first color conversion, and second color conversion, so as to obtain the second color device value P2 which is the color device value of the output image. Since the difference DI is 0 in the white pixel, the color device value P2 of the pixel in the output image becomes the color device value of white in the originating color space.

Meanwhile, the image processing apparatus 200 performs feature amount acquisition, difference calculation, first color conversion, and second color conversion only for a plurality of representative colors, so as to obtain the second color device values P2s of the plurality of representative colors. The image processing apparatus 200 then registers the color device values P0 in the originating color space of the plurality of representative colors in association with the second color device values P2s in the LUT 240. The image processing apparatus 200 refers to the content registered in the LUT 240, to calculate the second color device value P2 of each pixel other than white. Other processing in the image processing apparatus 100 and the image processing apparatus 200 are the same.

Accordingly, the image processing apparatus 200 is able to provide each effect obtained by the image processing apparatus 100.

Further, the feature amount acquisition, the difference calculation, the first color conversion, and the second color conversion are performed only for the plurality of representative colors. Thus, the output image can be generated with a small processing volume and with high speed.

Note that any possible modification described in the image processing apparatus 100 may be made to the image processing apparatus 200 as well. For example, a brightness, a color difference Eab, a color device value other than a luminance may be used as the feature amount. Further, the type of the function f used to calculate the second color device value P2s by performing the second color conversion is not limited.

The present invention has been described based on the exemplary embodiments. Note that the exemplary embodiments are merely examples, and various changes or modifications can be made without departing from the spirit of the present invention. As will be understood by a person skilled in the art, the variant examples with such changes and modifications are also within the scope of the present invention.

Industrial Applicability

The technique according to the present invention can be applied to color reproduction between color image reproducing apparatuses having different color characteristics.

| Reference Signs List | |
|---|---|
| 100 | IMAGE PROCESSING APPARATUS |
| 102 | FEATURE AMOUNT ACQUIRING UNIT |
| 104 | DIFFERENCE CALCULATION UNIT |
| 106 | FIRST COLOR CONVERTER |
| 108 | SECOND COLOR CONVERTER |
| 110 | OUTPUT IMAGE GENERATOR |
| 200 | IMAGE PROCESSING APPARATUS |
| 210 | COLOR SPACE INFORMATION STORING UNIT |
| 220 | REPRESENTATIVE COLOR GENERATION UNIT |
| 232 | FEATURE AMOUNT ACQUIRING UNIT |
| 234 | DIFFERENCE CALCULATION UNIT |
| 236 | FIRST COLOR CONVERTER |
| 238 | SECOND COLOR CONVERTER |
| 240 | LUT |
| 250 | OUTPUT IMAGE GENERATOR |

The invention claimed is:

1. An image processing method that generates, from an input image which is an image in an originating color space, an output image which is an image in a target color space, the image processing method comprising:

performing, for each color represented by a color device value of the input image, difference calculation processing that calculates a first difference, the first difference being a difference between a feature amount representing lightness of white in the originating color space and a feature amount representing lightness of said each color;

performing, for said each color, a first color conversion by means of colorimetric color reproduction to convert the color device value of said each color to a first color device value which is a color device value in the target color space; and performing an output image generation processing, for each said color, the output image generation processing comprising performing a second color conversion that calculates a second color device value and outputting the second color device value as a color device value of the output image, the second color device value being the color device value when the first difference is 0, and the second color device value being a sum of the color device value and a value which is obtained by multiplying a second difference which is a difference between the first color device value and the color device value by a coefficient which is larger than 0 and is equal to or smaller than 1 when the first difference is greater than 0.

2. The image processing method according to claim 1, wherein the coefficient becomes larger as the first difference becomes larger.

3. The image processing method according to claim 1, wherein the difference calculation processing and the first color conversion are performed only for a plurality of representative colors,
the output image generation processing performs the second color conversion only for the plurality of representative colors,
the output image generation processing registers, in a look-up table, for each of the plurality of representative colors, a corresponding color device value in the originating color space in association with a corresponding second color device value obtained by the second color conversion, and
the output image generation processing refers to the look-up table to calculate the second color device value corresponding to the color device value of said each color for colors other than white of each color represented by each color device value of the input image by using interpolation, and obtains a color device value of the output image by using a color device value of white in the originating color space for a white color.

4. The image processing method according to claim 1, wherein the feature amount includes at least any one of a luminance, a brightness, a color component, a color difference Eab, and a color device value.

5. A non-transitory computer readable medium that records a program causing a computer to execute processing, when generating an output image which is an image in a target color space from an input image which is an image in an originating color space, the processing comprising:
difference calculation processing, for each color represented by a color device value of the input image, for calculating a first difference, the first difference being a difference between a feature amount representing lightness of white in the originating color space and a feature amount representing lightness of said each color;
first color conversion, for said each color, for converting the color device value of said each color to a first color device value which is a color device value in the target color space by means of colorimetric color reproduction; and
output image generation processing for performing second color conversion that calculates a second color device value and outputting the second color device value as a color device value of the output image, the second color device value being the color device value when the first difference is 0, and the second color device value being a sum of the color device value and a value which is obtained by multiplying a second difference which is a difference between the first color device value and the color device value by a coefficient which is larger than 0 and is equal to or smaller than 1 when the first difference is greater than 0.

6. The non-transitory computer readable medium according to claim 5, wherein the coefficient becomes larger as the first difference becomes larger.

7. The non-transitory computer readable medium according to claim 5, wherein
the difference calculation processing and the first color conversion are performed only for a plurality of representative colors,
the output image generation processing performs the second color conversion only for the plurality of representative colors;
the output image generation processing registers, in a look-up table, for each of the plurality of representative colors, a corresponding color device value in the originating color space in association with a corresponding second color device value obtained by the second color conversion, and
the output image generation processing refers to the look-up table to calculate the second color device value corresponding to the color device value of said each color for colors other than white of each color represented by each color device value of the input image by using interpolation, and obtains a color device value of the output image by using a color device value of white in the originating color space for a white color.

8. An apparatus comprising:
a first converter circuit that calculates a first difference between an input color and a white color in an origin color space;
a second converter circuit that converts the input color to a target color in the target color space; and
a third converter circuit that generates an output color in the target color space, wherein the output color equals the target color when the first difference equals zero, and wherein the output color equals a sum of the input color and an intermediate color when the first difference does not equal zero, wherein the intermediate color is a product of a coefficient and a second difference between the input color and the target color.

9. The apparatus according to claim 8, wherein the coefficient becomes larger as the first difference becomes larger.

10. The apparatus according to claim 8, wherein the third converter circuit stores a mapping between a plurality of representative input colors and a corresponding plurality of representative output colors, and wherein the third converter circuit interpolates from the mapping to convert a non-representative input color to a corresponding non-representative output color.

11. The apparatus according to claim 8, wherein the first difference is based on at least any one of a luminance, a brightness, a color component, a color difference Eab, and a color device value.

12. The apparatus according to claim 10, further comprising a generator circuit that generates the plurality of representative input colors.

* * * * *